(12) United States Patent
Pilu (10) Patent No.: US 7,606,442 B2
(45) Date of Patent: Oct. 20, 2009

(54) IMAGE PROCESSING METHOD AND APPARATUS

(75) Inventor: Maurizio Pilu, London (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 654 days.

(21) Appl. No.: 11/342,841

(22) Filed: Jan. 31, 2006

(65) Prior Publication Data

US 2006/0193536 A1 Aug. 31, 2006

(30) Foreign Application Priority Data

Jan. 31, 2005 (GB) .................... 0501890.8

(51) Int. Cl.
*G06K 9/32* (2006.01)
*G06K 9/46* (2006.01)

(52) U.S. Cl. .................... 382/298; 382/190
(58) Field of Classification Search ............. 382/190, 382/195, 298, 103, 291, 293
See application file for complete search history.

(56) References Cited

U.S. PATENT DOCUMENTS 5,210,799 A * 5/1993 Rao ................... 382/103

2002/0114535 A1 8/2002 Luo
2002/0178149 A1 * 11/2002 Chen et al. ................ 707/3

FOREIGN PATENT DOCUMENTS

| EP | 1 107 019 A2 | 7/2000 |
| EP | 1 235 182 A2 | 8/2002 |
| GB | 2 393 062 A | 3/2004 |

* cited by examiner

*Primary Examiner*—Yon Couso (57) ABSTRACT

In a method of and an apparatus for processing image data representing an image saliency data for the image is generated by determining a series of features of the image and the determined features are used to generate a probability measure for each point of the image representative of a location of a subject of the image. The saliency data is processed using respective ones of weighting functions of a plurality of spatial scales in order to determine the positions of regions of interest of the image at respective ones of the scales. Response data is generated for each scale representing the relative strength of response of the saliency data at the positions of the determined regions of interest to the function at that scale.

21 Claims, 10 Drawing Sheets

IMAGE PROCESSING METHOD AND APPARATUS

RELATED APPLICATIONS

The present application is based on, and claims priority from, GB Application Number 0501890.8, filed Jan. 31, 2005, the disclosure of which is hereby incorporated by reference herein in its entirety.

FIELD OF THE INVENTION

The present invention relates to the field of image processing

BACKGROUND

It is known to be able to zoom in on a portion of an image captured using a digital camera or videocamera. For example, digital cameras commonly include a screen upon which an image can be previewed before capture, and viewed post-capture. The screen can be used to manually zoom into and view portions of a captured image at preset magnification factors for example.

Some devices provide a semi-automatic zoom function. Generally, such systems automatically zoom into a captured image by a predetermined amount following image capture. A user may initiate such a function by pressing a button on the device following capture of an image, and a magnified portion of the captured image is then displayed. For example, a central portion of the image may be displayed at increased magnification since, in such systems, this is generally taken to be the area in which salient material in the image is located.

Techniques exist for determining an area of potential saliency in an image, and these have been applied to systems in order to effect automatic cropping of the image. For example, U.S. Pat. No. 6,654,507 describes a method for cropping a portion of an image by identifying a potential main subject of the image. A belief map is generated comprising image features, each feature having a measure assigned thereto representative of the probability that it is the main subject of the image. The image is cropped to include the feature with the highest probability.

Further techniques exist for providing automatic cropping of an image in response to a determination of salient portions in the image. For example, European Patent Application No. 02251070.5.

In, Yu-Fei Ma, Hong-Jiang Zhang, "Contrast-based image attention analysis by using fuzzy growing," Proceedings of the eleventh ACM international conference on Multimedia, November 2003, a saliency map is created using normalized local contrast measures. Salient regions are identified using a region growing method.

In Xian-Sheng Hua, Lie Lu, Hong-Jiang Zhang, "Automatically converting photographic series into video," Proceedings of the 12th annual ACM international conference on Multimedia, October 2004, saliency locations areas found using Yu-Fei Ma, Hong-Jiang Zhang, "Contrast-based image attention analysis by using fuzzy growing," Proceedings of the eleventh ACM international conference on Multimedia, November 2003, are used to generate a dynamic viewing path. The method designates saliency locations as keyframes and then uses explicit film making rules to place them in a preferred order.

Also in this connection, WO GB01/05683 provides a system for determining salient portions in an image and generating an automatic rostrum path for the image in order that salient portions can be displayed along the path.

SUMMARY OF THE INVENTION

According to a first aspect of the present invention there is provided a method of processing image data representing an image, the method comprising generating saliency data for the image by determining a series of features of the image and using the determined features to generate a probability measure for each point of the image representative of a location of a subject of the image, processing the saliency data using respective ones of weighting functions of a plurality of spatial scales in order to determine the positions of regions of interest of the image at respective ones of the scales, and generating response data for each scale representing the relative strength of response of the saliency data at the positions of the determined regions of interest to the function at that scale.

According to a second aspect of the present invention there is provided a method of processing image data representing an image, the method comprising generating saliency data by determining a series of features of the image and using the determined features to generate a probability measure for each point of the image representative of a location of a subject of the image, convolving the saliency data with a set of functions of respectively different spatial scales in order to generate response data representing a saliency density for the image at respective ones of the spatial scales, determining from the response data spatial maxima in the saliency density across the respective scales for respective ones of the determined features, and selecting, using the spatial and scale location of a determined maxima, image data representing a salient image portion at that scale.

According to a third aspect of the present invention there is provided apparatus comprising a processor operable to process image data representing an image, the processor operable to generate saliency data for the image by determining a series of features of the image and using the determined features to generate a probability measure for each point of the image representative of a location of a subject of the image, process the saliency data using respective ones of weighting functions of a plurality of spatial scales in order to determine the positions of regions of interest of the image at respective ones of the scales, and generate response data for each scale representing the relative strength of response of the saliency data at the positions of the determined regions of interest to the function at that scale.

According to a fourth aspect of the present invention there is provided a computer program product for use with a computer, said computer program product comprising a computer useable medium having computer executable program code embodied thereon, wherein said product is operable, in association with said computer, to generate saliency data using image data representing a captured image by determining a series of features of the image and use the determined features to generate a probability measure for each point of the image representative of a location of a subject of the image, process the saliency data using respective ones of weighting functions of a plurality of spatial scales in order to determine the positions of regions of interest of the image at respective ones of the scales, and generate response data for each scale representing the relative strength of response of the saliency data at the positions of the determined regions of interest to the function at that scale.

According to a fifth aspect of the present invention there is provided a computer program, comprising machine readable instructions, wherein said program is arranged, in association with said machine, to generate saliency data using image data representing a captured image by determining a series of features of the image and using the determined features to generate a probability measure for each point of the image representative of a location of a subject of the image, process the saliency data using respective ones of weighting functions of a plurality of spatial scales in order to determine the positions of regions of interest of the image at respective ones of the scales, and generate response data for each scale representing the relative strength of response of the saliency data at the positions of the determined regions of interest to the function at that scale.

According to a sixth aspect of the present invention there is provided a method of processing image data representing an image captured using an image capture device, the method comprising processing the image data in order to generate saliency data representing salient portions of the image, processing the saliency data at a plurality of spatial scales using respective ones of a plurality of weighting functions, the processing operable to generate response data representative of a measure of the relative saliency of portions of the image at respective ones of the spatial scales, using the response data in order to determine a preferred scale for the salient portions of the image by determining maxima in the response data for respective ones of the salient portions, and generating region data representing respective ones of the salient portions at their preferred scales, using the region data to generate a visualisation path which substantially traverses respective ones of the salient portions, wherein the path is generated on the basis of the scale of the salient portions, and the relative distance between salient portions.

BRIEF DESCRIPTION OF THE DRAWINGS

For a better understanding of the invention, and to further highlight the ways in which it may be brought into effect, reference is made, by way of example only, to the following figures in which:

FIG. 2b is a schematic representation of the relative saliency of respective points of the image in FIG. 2a;

The terms "comprises" or "comprising when used in this specification specify the presence of stated features, integers, steps or components but do not preclude the presence or addition of one or more other features, integers, steps, components or groups thereof.

DETAILED DESCRIPTION

Figure 1:
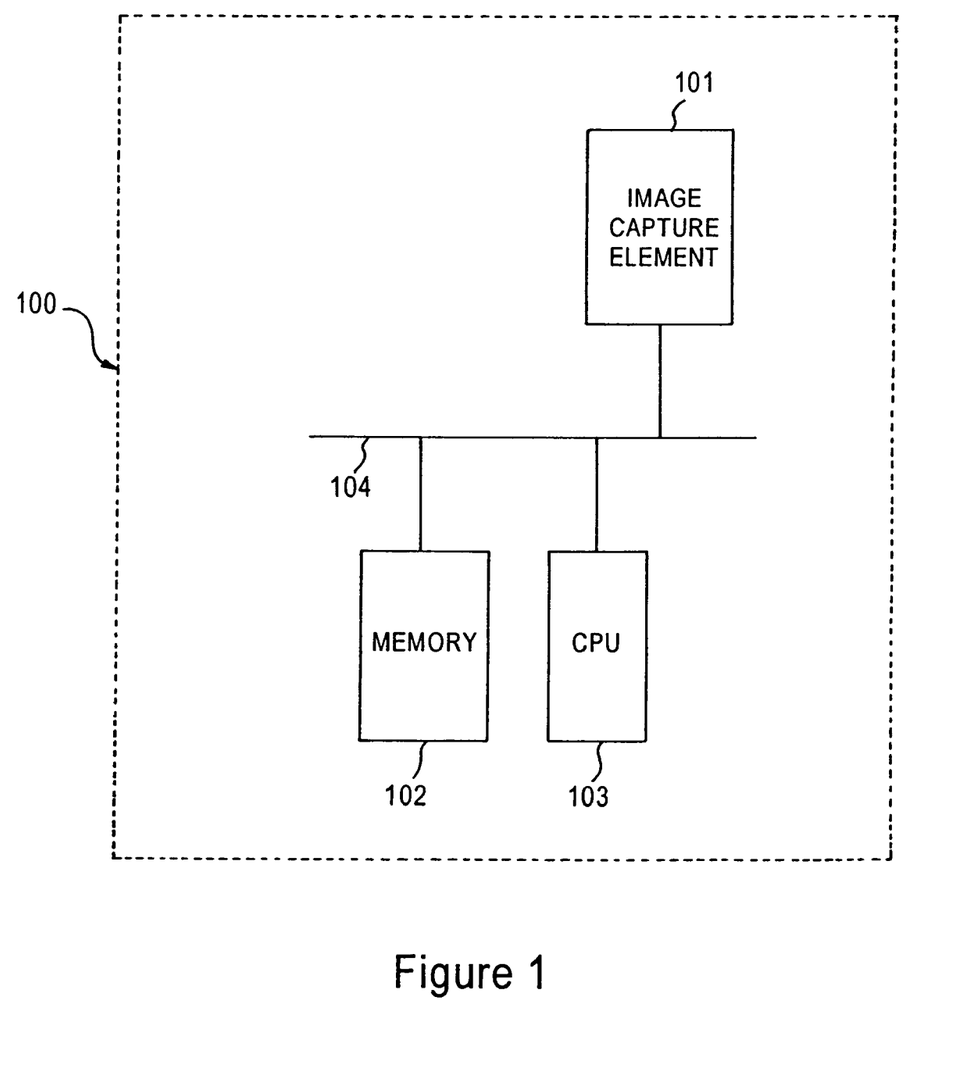
FIG. 1 is a schematic representation of an image capture device operable in accordance with an embodiment.

FIG. 1 is a schematic representation of an image capture device 100 operable in accordance with an embodiment. The device 100 can be a digital or analogue still or video camera or combination thereof or a logic circuit of the digital or analogue still or video camera or combination thereof. Alternatively, the device 100 may form part of a mobile station, such as a mobile telephone for example, or a PDA. Other suitable alternatives are possible.

The device 100 comprises an image capture element 101 such as a CCD, CMOS or other suitable device operable to generate image data representative of an image captured (or capturable) by the device 100. The captured image (or a preview of an image) can be presented to a user on a display of device 100 (not shown). Device 100 further comprises a memory 102 which can be a dynamic random-access memory (DRAM) and can comprise non-volatile memory (e.g. flash, ROM, PROM, etc.) and/or removable memory (e.g. memory cards, disks, etc.) for example. Memory 102 can store raw image digital data as well as processed image digital data processed by a suitable processor 103 of device 100. Device 100 can comprise a digital signal processor (not shown) in addition to processor 103. Alternatively, processor 103 can be adapted to perform any necessary digital signal processing operations. Device 100 comprises a bus, or similar, 104 to connect the various device components as is customary.

Figure 2A:
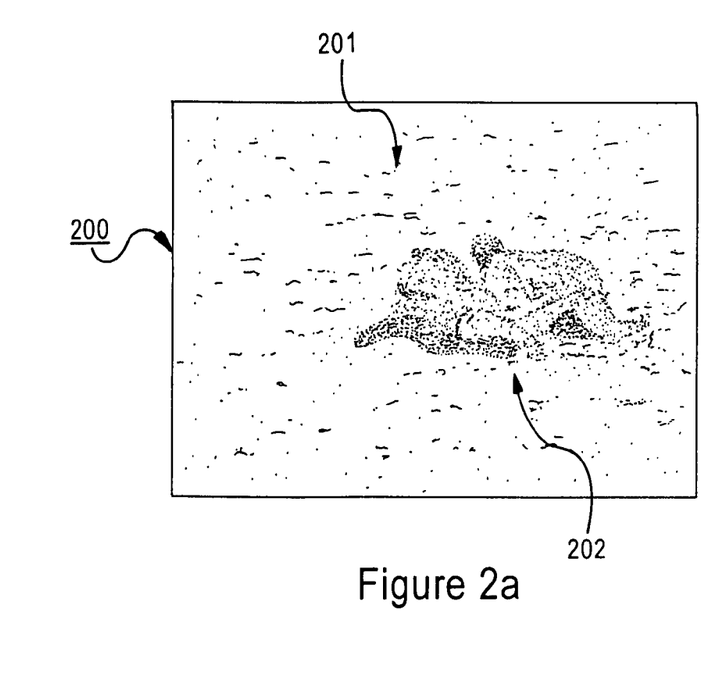
FIG. 2a is an exemplary image captured using the device of FIG. 1 and comprising a foreground with an image subject, and a background.
Figure 2B:
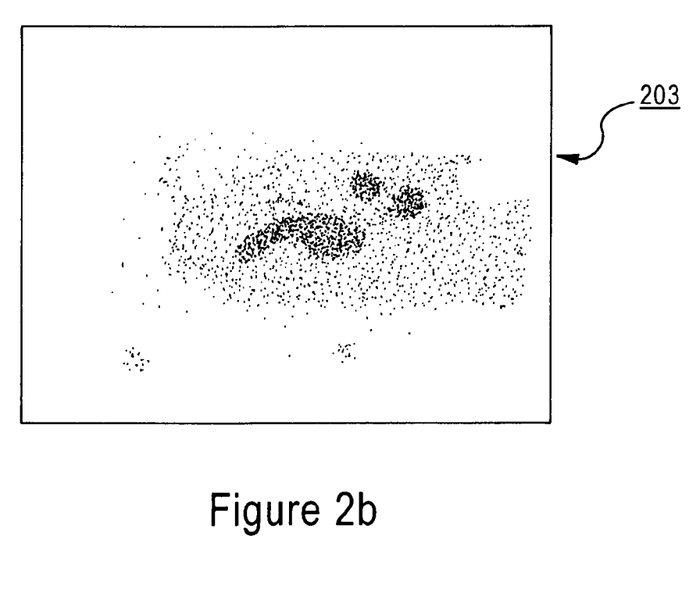

Device 100 is operable to capture an image of a scene or object as desired. An exemplary captured image is depicted in FIG. 2a. The image 200 of FIG. 2a comprises a background area, generally denoted by 201, and a subject of the image generally denoted by 202—the two children playing. According to a preferred embodiment, salient areas of the image 200 are determined using known methods. For example, the method of Itti, Koch and Niebur ("A Model of Saliency-based Visual Attention for Rapid Scene Analysis", IEEE Transaction on Pattern Analysis and Machine Intelligence, 20(11), 1254-1259, 1998, which is incorporated herein by reference in its entirety) can be used in order to derive a 'saliency map' for the image 200. Such a saliency map is depicted in FIG. 2b. The saliency map 203 provides a measure representative of the relative saliency—or potential 'interesting-ness'—of respective points of image 200. The saliency map 203 is a schematic representation of an abstract concept generally embodied by data which represents the relative saliency of respective points of the image 200, and is not intended to be limiting in this respect. The saliency map (data) may be generated by device 100 using processor 103 using the above method, and stored in memory 102 as appropriate. It will be appreciated by those skilled in the art that other methods for determining, and displaying if necessary, a suitable saliency map or data, or other similar measure, exist, and can be used instead of the above.

Figure 3:
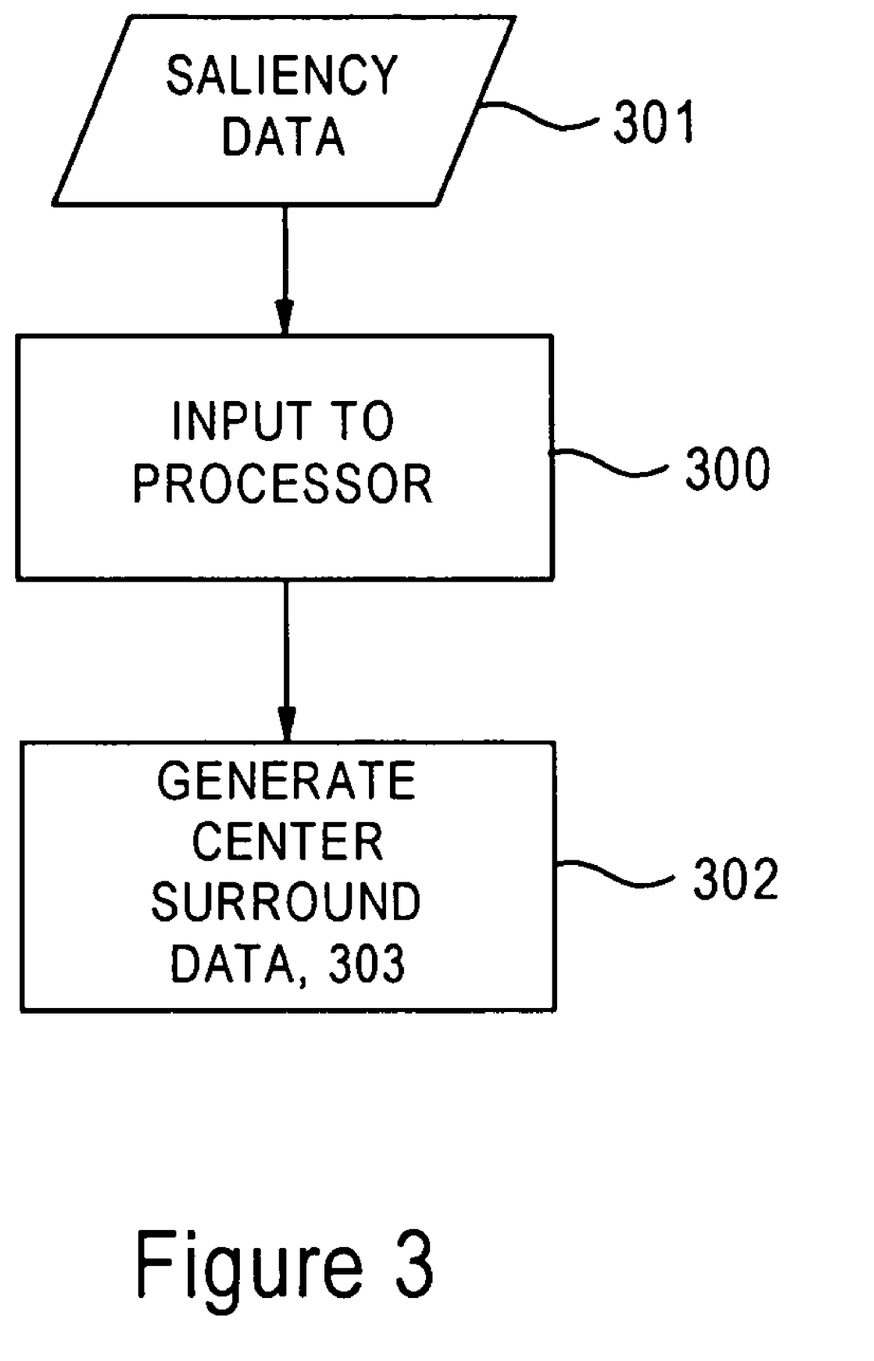
FIG. 3 is a flow chart of the process according to a preferred embodiment using data obtained from the saliency map of FIG. 2b.
Figure 4:
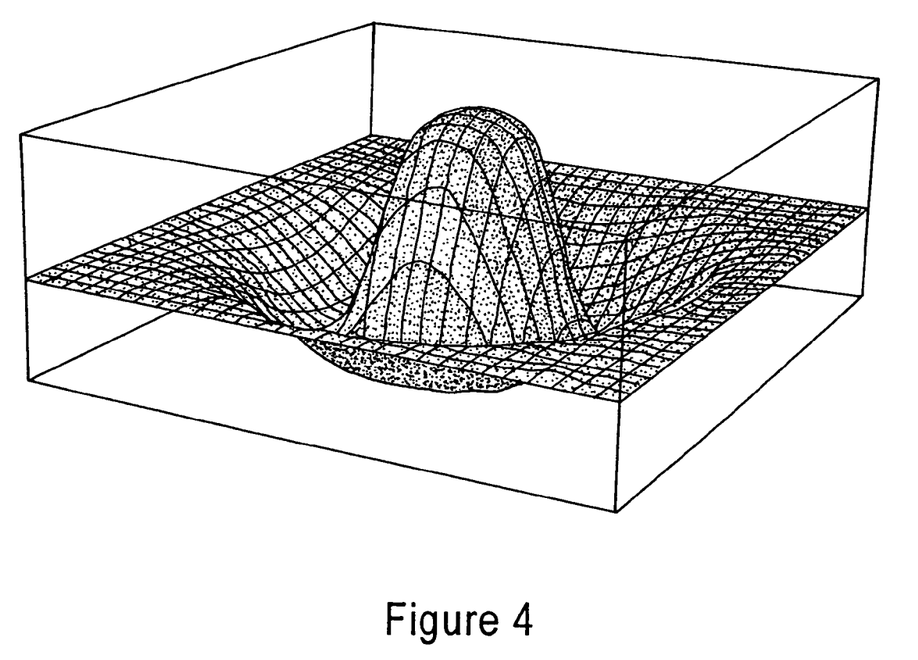
FIG. 4 is a schematic representation of an exemplary kernel.

FIG. 3 of the accompanying drawings is a flow chart representing a procedure to generate data according to a preferred embodiment. Data 301 representing the relative saliency of respective points of image 200 as embodied by the saliency map in FIG. 2b is input to processor 103 at step 300. The data 301 is processed in order to generate data 303. In a preferred embodiment, data 303 is generated using a set of kernels (functions) which are convolved with the data 301 in a conventional known way. The functions represent kernels which have substantially positive coefficients in an inner spatial region thereof, and substantially negative coefficients in an outer spatial region thereof. In a preferred embodiment, all kernel coefficients are constant. A schematic representation of an exemplary kernel is shown in FIG. 4. The kernel is in the form of a 'mexican hat'. In practice, the convolution of the function with saliency data can proceed by ensuring that at each point of a saliency map with which convolution is to occur, the mexican hat has portions above and below (in a spatial sense) the image plane. This then allows an approximation of the derivative of the saliency map at each point convolution occurs. The function can have a form:

$$\sim \left(2 - \frac{r^2}{a^2}\right) e^{-\frac{r^2}{2a^2}}$$

where $r^2 = x^2 + y^2$ and 'a' is a constant. Other alternatives are possible, and the above is not intended to be limiting.

Figure 5:
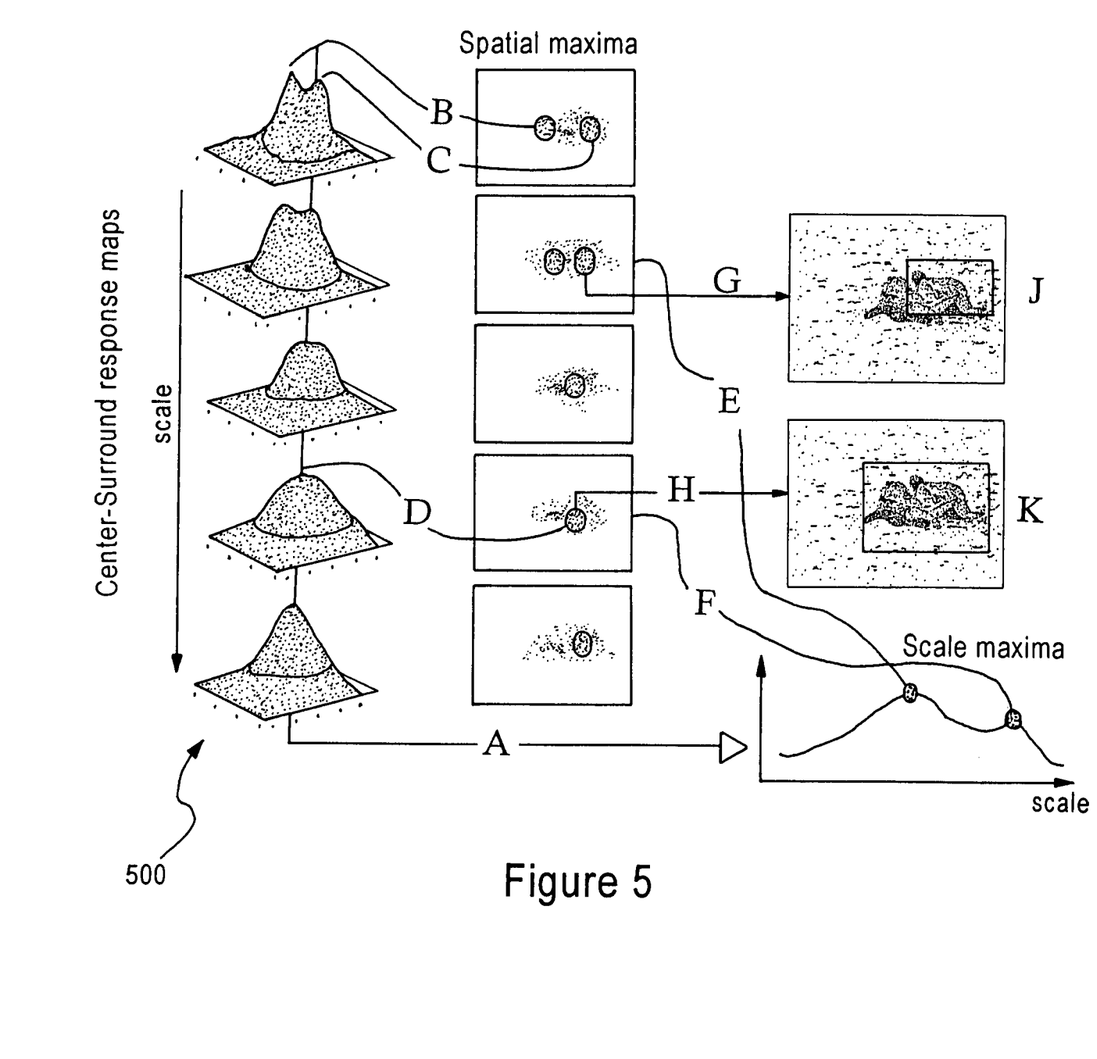
FIG. 5 is a schematic representation of a set of centre-surround response maps corresponding to respective kernels applied to the saliency map of FIG. 2b.

Data 303 represents the response of data 301 to respective ones of the kernels, and more specifically the response of data falling within the support of a kernel centred at respective pixel locations of image 200. According to an embodiment, data 303 can be termed response data, or centre-surround response data, referring to the fact that the response at a point, or pixel location, of image 200 is determined based on the convolution of respective ones of kernels centred at that location with data falling within the support of the kernel at that point. The centre-surround response data can be used to form a set of centre-surround maps such as those illustrated in FIG. 5 at 500. Each of the maps 500 of FIG. 5 represents the response at respective locations of image 200 at the scale of the kernel used to generate the data for the relevant map—arrow 501 shows the direction of increasing scale of the maps 500 of FIG. 5. The peaks of a map of FIG. 5 represent the regions of greatest response of the image to convolution with a kernel at the relevant scale. The location of salient structures (regions) in an image is therefore indicated by maxima in the spatial derivative of a response map, whereas a natural size (scale) of the structure corresponds to maxima of the scale-space derivative of the response at that spatial location (see for example, T. Lindenberg, Scale-Space Theory in Computer Vision, Kluwer Academic Publishers, 1994, which is incorporated herein by reference in its entirety). The saliency map also indicates potential portions of salient material in the image.

Figure 6A:
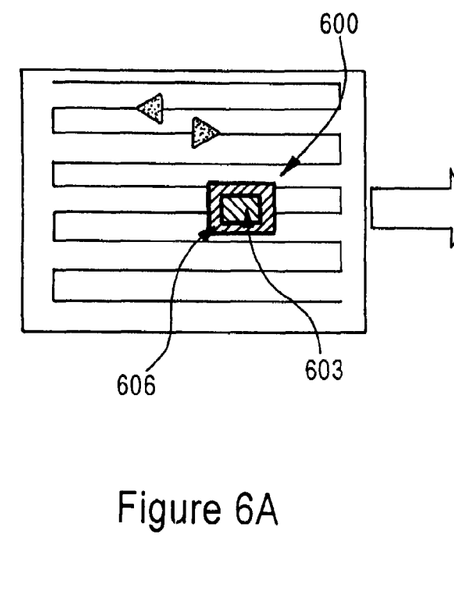
FIGS. 6a to 6c are schematic representations depicting a process to generate a set of centre-surround response maps from the saliency map of FIG. 2b using suitable kernels.
Figures 6B, 6C:
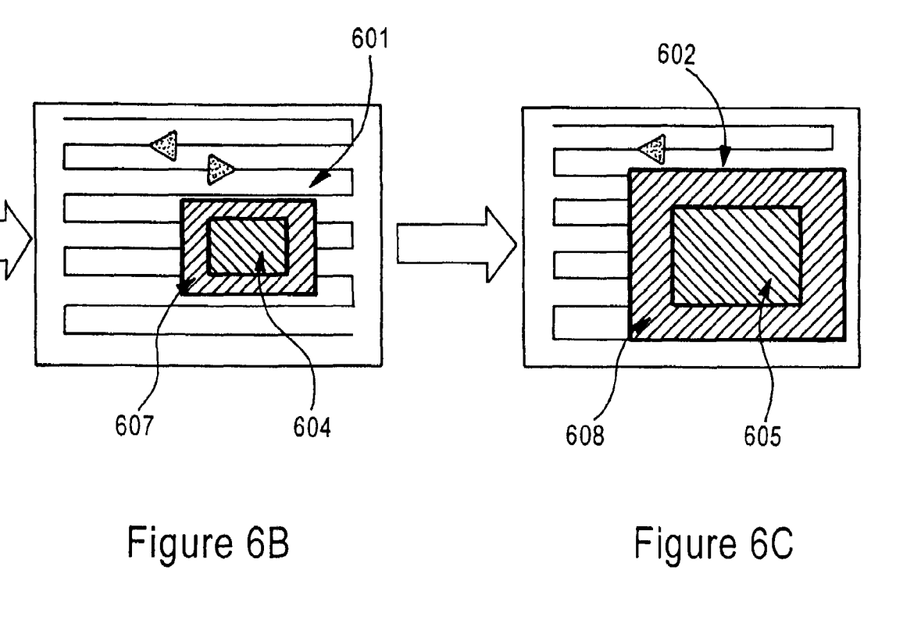

FIGS. 6a to 6c are schematic representations depicting an exemplary process used to generate the set of centre-surround response maps from the saliency map of FIG. 2b using suitable kernels. Each kernel 600,601,602 comprises an inner and outer region comprising coefficients with substantially positive and negative coefficients respectively, as explained above. The inner regions for kernels 600,601,602 are depicted at 603,604,605 respectively, and the outer regions are depicted at 606,607,608 respectively. It will be appreciated by those skilled in the art that other kernels may be used, and the above is not intended to be limiting. Each kernel 600,601, 602 is applied at (convolved with) every location (pixel) of the saliency map of FIG. 2b, and a scale space of the responses is created by using kernels of different spatial sizes. In the case of FIG. 5 three such kernels have been used. Additional or fewer can be used.

With reference to FIGS. 6a to 6c, and the corresponding image in FIG. 2a, it can be seen that spatial maxima of the centre-surround maps 600 correspond to the location of salient clusters at that particular scale, and the maxima of a response map can therefore be characterised as representing salient clusters at the natural scale at which those clusters occur in the image.

Hence, salient portions of a captured image are determined at a plurality of spatial scales. The salient portions, or regions of interest, can then be used as candidates for a rostrum path generation. Determining regions of interest at a plurality of scales enables a determination to be made about how much to zoom into an image without neglecting large scale structures of the image. Hence the location of structures in an image at a particular scale is indicated by a maximum in the spatial derivative of the response map of the scale in question. The natural size (scale) of a structure corresponds to maxima of the scale-space derivative of the response at that spatial location.

Once salient portions of an image have been determined as explained above, the results can be used to enable a user of an image capture device to sample the salient portions. As explained, the provision of determining salient portions of an image at various spatial scales helps to ensure that substantially all relevant parts of an image are sampled in a rostrum display, and in a preferred order so that relevant material in an image is not 'overlooked' during the visual tour of the image. An area around a determined salient portion can be used in addition to the portion itself in order to provide context for the sampled portion. Preferably a bounding box of dimensions at least large enough to encompass the salient portion can be used in this respect. The aspect ratio of the box can be determined with consideration of the device upon which the portions are to be displayed, for example.

According to a preferred embodiment, the provision of sampling salient portions of a captured image proceeds in the form of a rostrum, in which areas of an image are viewed at an increased magnification factor with respect to the originally captured image by a notional camera which moves across the image—the view 'seen' by this notional camera is displayed to a user as the rostrum view of the image. The transition between displayed areas can proceed in a number of ways. For example, a velocity of the notional camera can take a quadratic form between salient portions such that a salient portion is dwelled upon for a predetermined amount of time followed by increasing in velocity to the next salient portion to be displayed and a corresponding decrease in velocity as this portion is approached and so on. Other alternatives are possible such as a linear velocity between salient areas for example.

Preferably, areas of an image which have been determined as containing potential salient material at a larger spatial scale are displayed first, with respective areas determined as containing potential salient material at progressively smaller spatial scales being displayed thereafter. The distance between respective salient areas can also be taken into account when determining a suitable path. For example, if a smaller region is closer to the region under display than a larger region, the smaller region can be displayed in preference to the larger region. This helps to ensure that a generated path produces a pleasing effect, and does not simply move back and forth between regions based solely on their size—distance between regions is also a factor.

This helps to ensure that no relevant detail in the image is missed during the sampling process, and that a pleasing result is achieved.

Figure 7:
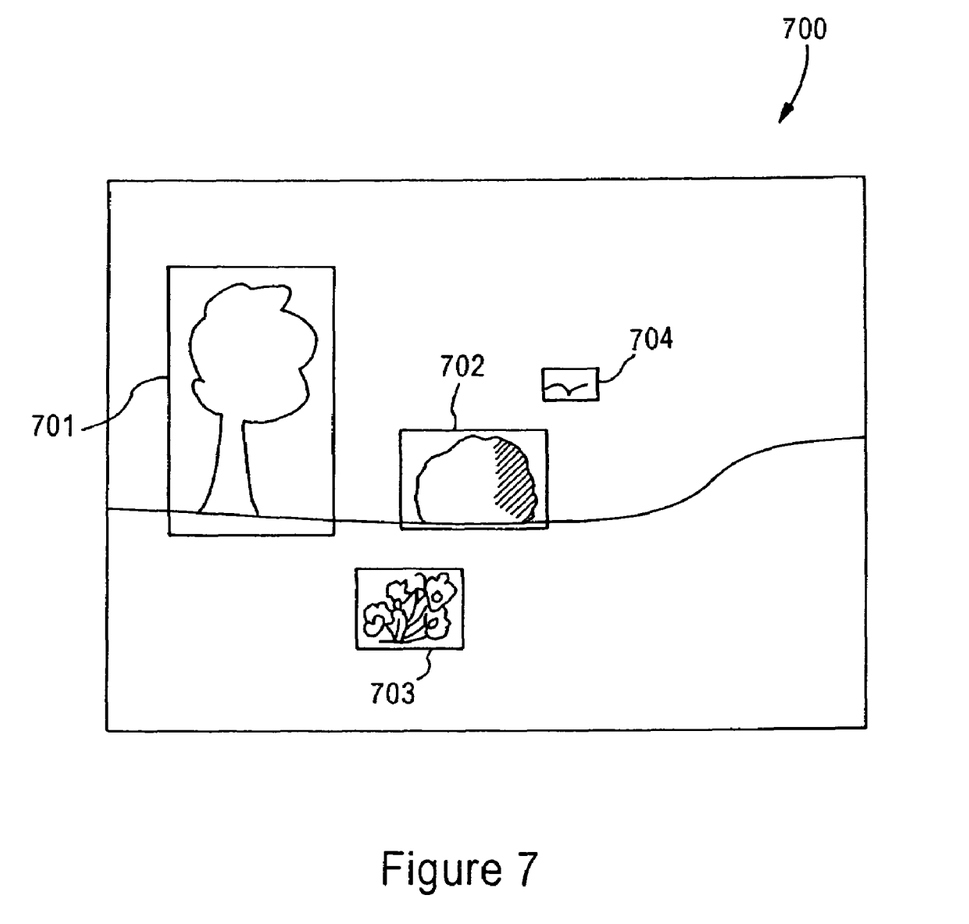
FIG. 7 is a schematic representation of an image including superimposed regions of interest.

FIG. 7 is a schematic representation of a captured image 700. Superimposed onto the image are areas 701, 702, 703 and 704 which represent bounding boxes surrounding salient portions of the image 700 elucidated at respectively decreasing spatial scales. Preferably, the bounding boxes have substantially the same aspect ratio as the display upon which the salient portions of an image are to be sampled, however this need not be the case, and the bounding areas can be of any shape or configuration. Areas 701, 702, 703 and 704 are displayed using a display of device 100 such that the area being displayed fills the display, thereby providing for magnification of the area. During transitions from area to area, displayed image portions may be displayed at progressively increasing magnification. For example, the magnification factor between relevant areas may be interpolated based on the factor of the area under display, and the necessary factor of the area to be displayed such that a linear increase in magnification is provided during the transition. Other effects are possible.

According to a preferred embodiment, a rostrum path is generated across the image such that areas 701, 702, 703 and 704 are displayed in order of decreasing size (and hence increasing magnification factor). Area 701 is the largest, with the size of the areas decreasing to 704 which is the smallest of those depicted. As explained, it is desirable to display the largest area first, and gradually increase the magnification of the image in order to display the rest of the areas in order of decreasing size (and hence increasing magnification), whilst also taking into account the distance between respective portions in order to avoid generating a path which moves back and forth between regions, or which is longer than necessary. A guiding principle of least commitment is used—it is safer to show larger regions of interest first and then progressively move to smaller and smaller regions. For example, larger regions are very likely to contain the subject (or subjects) of an image, whereas smaller regions presented in the rostrum are more likely to be incorrect in that they do not contain a main subject of an image. Therefore potentially irrelevant image details are not presented to a user first, but rather progressively more 'risks' are taken as the rostrum path advances.

It is desirable to minimise the distance travelled by the notional camera between regions of interest. In this connection, areas to be displayed can be ranked according to their size and the relative (Euclidean) distance between them. Preferably, the distance between determined salient areas in a generated rostrum path is minimised in order to avoid the notional camera 'dodging' about the image. Advantageously, the rostrum path is a geodesic through the determined regions of interest with larger areas at the beginning of the path followed by progressively smaller areas along its length. Other alternatives are possible.

Figure 8:
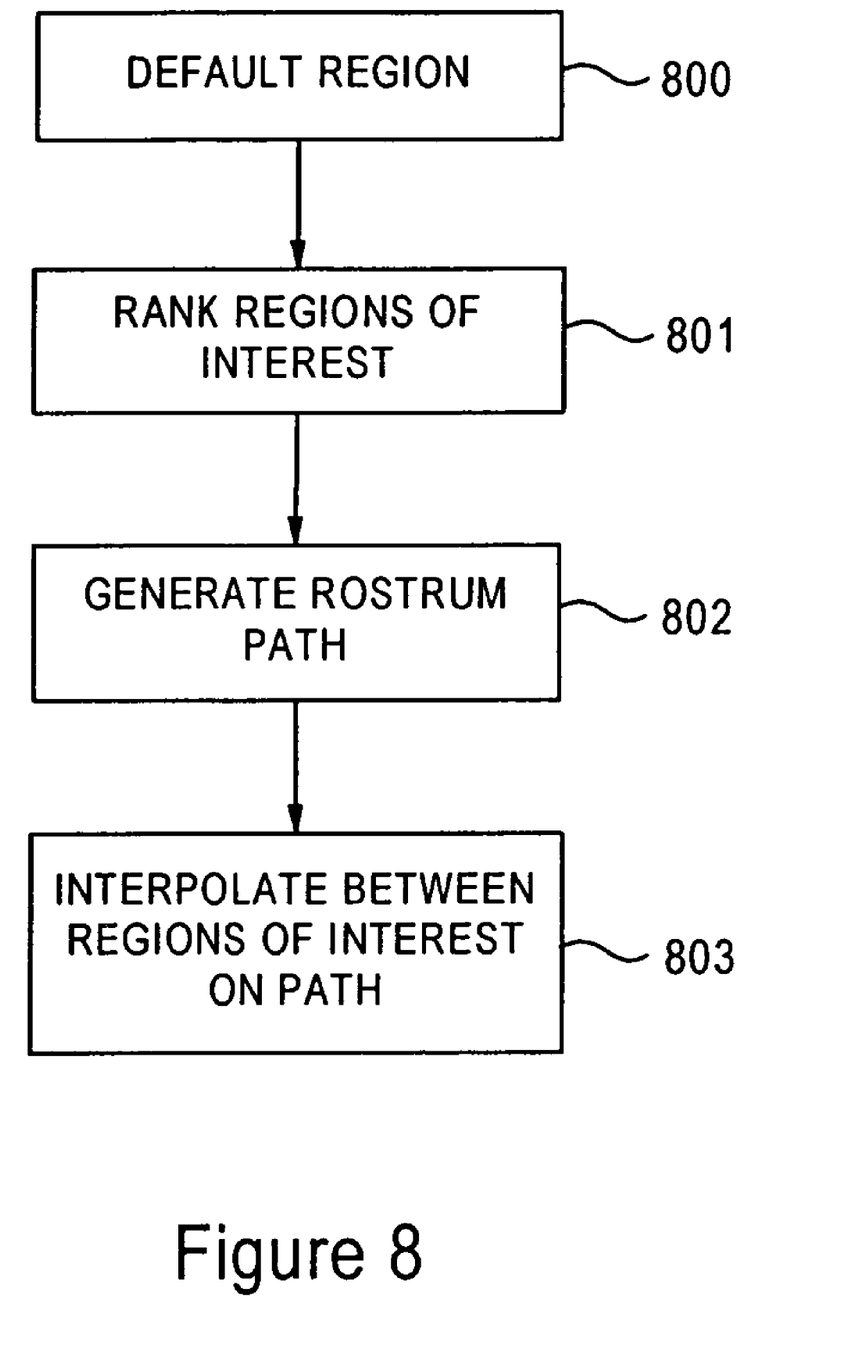
FIG. 8 is a flow diagram representing an exemplary procedure for generating a rostrum path.

FIG. 8 is a flow diagram representing an exemplary procedure for generating a suitable rostrum path for an image which has been captured by a device such as that described above.

Starting from a default region of interest 800, which can be the full captured image for example, all regions of interest (as determined using the method explained above) are ranked (801) based on the minimum travelled Euclidean distance in the three-dimensional position/size space. Then, a four-dimensional space-time path is generated (rostrum path, 802) which traverses all the determined regions of interest stopping at each of them for a preset time for example. Alternatively, the time spent at each region of interest can be dependent on a measure of the relative saliency of the region. The path between regions of interest is interpolated (803), and can be linear in position/size and parabolic in time as described above so that after a preset time (if appropriate) it accelerates away from the current region of interest and decelerates when approaching the next region of interest for example. Other alternatives are possible.

Figure 9:
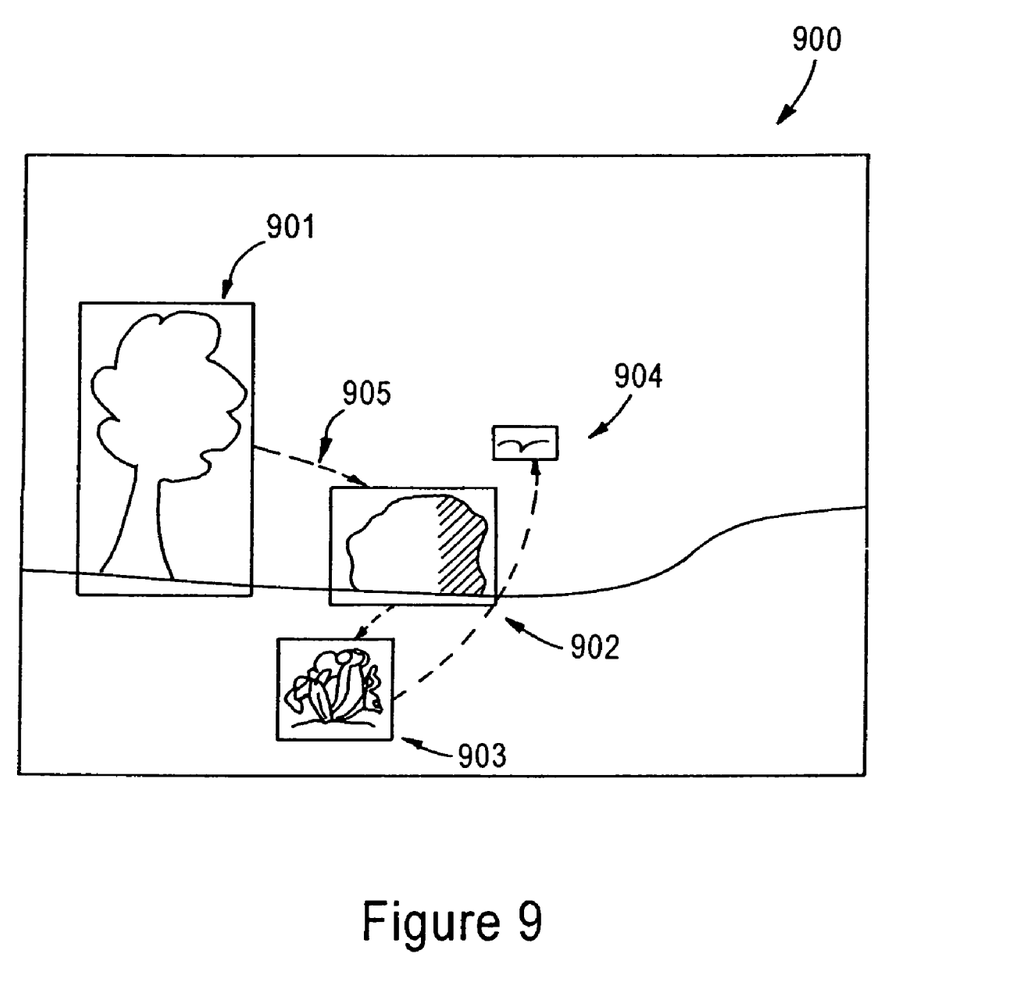
FIG. 9 is a schematic representation of an image including superimposed regions of interest, and the rostrum path.

FIG. 9 is a schematic representation of an image 900 onto which potential regions of interest (salient areas) have been determined using the method as explained above, and which have been indicated by superimposing areas 901, 902, 903, 904 onto the image. The line 905 represents a generated rostrum path according to a preferred embodiment.

The path 905 begins at 901, the largest of the regions of interest. From 901, it can be seen that regions 902 and 903 are substantially the same distance from 901. However, region 902 is larger in area than 903, and therefore 902 is the next area to be displayed using the path 905. From region 902, region 904 is nearest. However, it can be seen that region 904 is smaller in size than region 903. Region 903 can be displayed next on the path 905, with 904 being displayed last. Other alternatives are possible. In particular, 904 can be displayed following region 902 with 903 after that due to the distance between the portions. The transition in between areas can proceed as explained above.

Hence, spatial clustering of a saliency data generated from image data representing a captured image is used to determine salient regions of the image that can be used as candidates for a rostrum path generation. A number of ways can be used to perform clustering providing that the analysis is performed at different scales.

To make a rostrum path more compelling some balanced risks can be taken on how much to zoom into details without neglecting large scale structures in an image. Analysing saliency at multiple scales and choosing which one best represents the data is therefore important. Accordingly, a weighting kernel of a given size (i.e. scale or bandwidth) is passed over an image (i.e. convolved with image data) and the response represents a map indicating 'how much' saliency (the density) there was under the kernel. The kernel can be one if the known smoothing kernels such as a Gaussian function for example. Kernels of various sizes are passed over an image in order to calculate the saliency density at different scales.

Using scale space theory principles, the location of structures in an image is indicated by maxima in the spatial derivative of a response map, whereas natural size (scale) corresponds to maxima of the scale-space derivative of the response at that spatial location.

The derivative for a particular scale can be approximated using a 'centre-surround' operator where the response of the saliency data to a smaller (inner) kernel is subtracted from the response to a larger (outer) kernel. This is advantageous where memory and processing considerations must be taken into account. When generating a rostrum path, larger areas are very likely to contain the subject (or subjects) whereas smaller regions are more likely not to. Hence, it is appropriate to make sure that potentially irrelevant details are not presented to a user at the beginning of a generated path, but that progressively more 'risks' are taken as the path is traversed such that smaller regions are shown towards the end of the path.

The above described can be used in connection with image capture devices as explained or with interactive viewing systems such as televisions, PDAs, mobile telephones etc. In each case, it is desirable, that should the system in question begin to display irrelevant or undesirable content that a user can press a button (or similar, including voice commands etc) and exit the automatic viewing. Such an auto-rostrum system can be employed in systems where there is a limited user interface and/or a requirement for user passivity (e.g. television viewing, digital photo frames etc) together with a low resolution display or excessive viewing distance for example.

Figure 10:
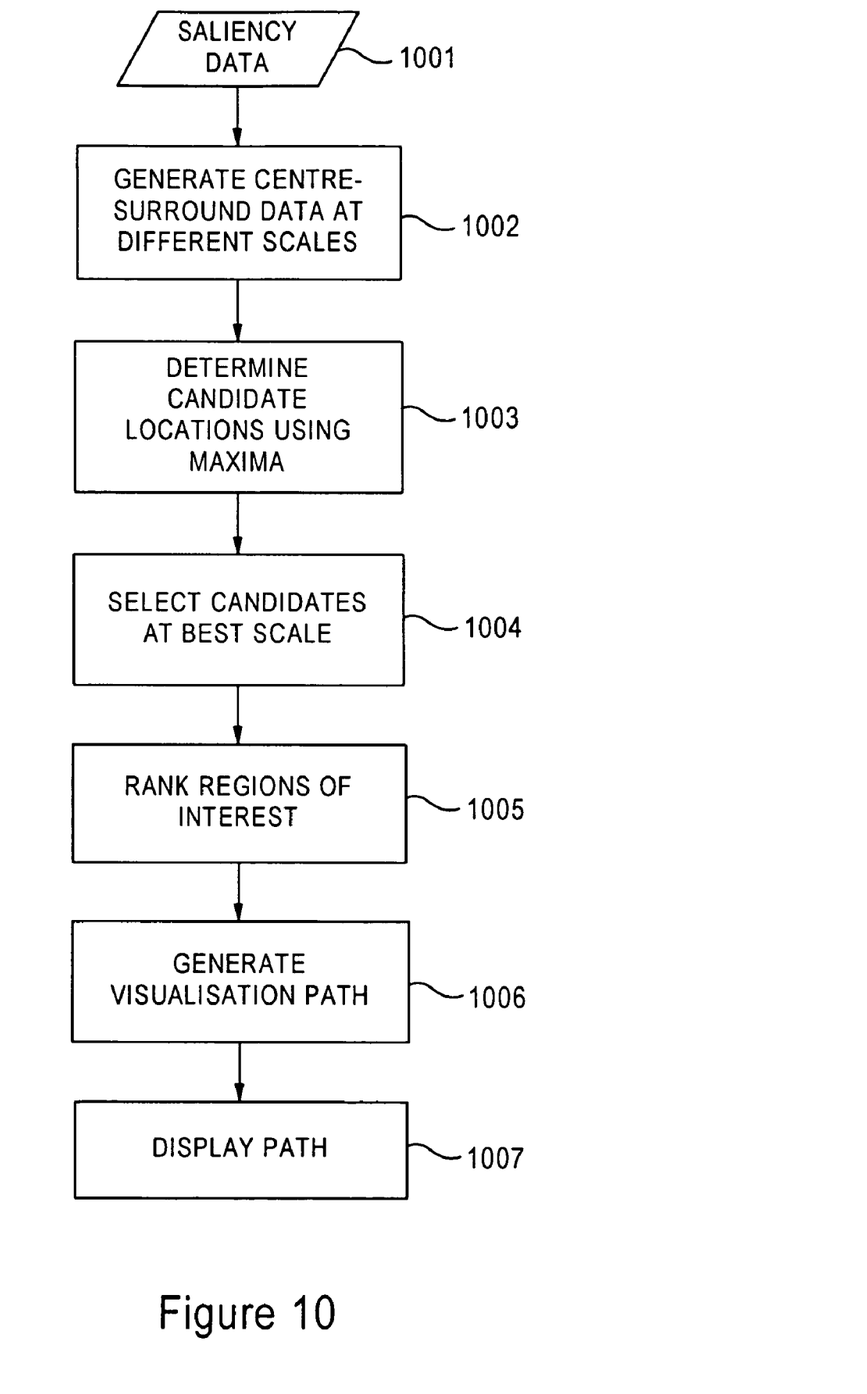
FIG. 10 is a flow diagram representing an exemplary procedure for determining salient portions of an image and generating a rostrum path to traverse such portions.

In this connection, FIG. 10 is a flow diagram representing an exemplary procedure for determining salient portions of an image and generating a rostrum path to traverse such portions. At 1001 saliency data is input to a processor, such as a processor of the image capture device as described above. At 1002 the saliency data is used to generate centre-surround data corresponding to the response of the saliency data to convolution (or similar) with a plurality of centre-surround kernels (functions) at a plurality of different spatial scales. At 1003, candidate salient locations in the image are determined by determining maxima in the centre-surround data. The best candidate regions are selected 1004 and then ranked 1005 according to some criterion such as spatial size (area for example) of the regions, and a visualisation path is generated 1006 to substantially traverse the regions. At 1007 the path is used in order to display regions of the image.

It will be appreciated by those skilled in the art that additional functionality can be added to the above system. For example, a face detection system can be added. Detected faces can be used in the generation of a visualisation path across the image in addition to the method as described above. Detected faces could, for example, cause a deviation in a generated path which would otherwise not have been there in order that a face is presented for viewing early on in the path. Other alternatives are possible.

The invention claimed is:

1. A method of processing image data representing an image, the method comprising steps stored on a tangible computer readable medium and performed by a processor, the steps comprising:
   generating saliency data for the image by determining a series of features of the image and using the determined features to generate a probability measure for each point of the image representative of a location of a subject of the image;
   processing the saliency data using respective ones of weighting functions of a plurality of spatial scales in order to determine the positions of regions of interest of the image at respective ones of the scales;
   generating response data for each scale representing the relative strength of response of the saliency data at the positions of the determined regions of interest to the function at that scale;
   for each determined region of interest, using the response data to determine a maximum response over all scales for that region; and
   using the position in the image corresponding to the determined maximum and the scale at which the maximum occurs to generate output image data representing a salient portion of the image at that scale and which corresponds to the region of interest in question.

2. A method as claimed in claim 1, wherein the output image data is displayed such that output image data representing a salient portion corresponding to a larger scale is displayed in preference to image data representing a salient portion corresponding to a smaller scale.

3. A method as claimed in claim 1, further comprising:
   generating path data representing a path which substantially traverses respective ones of the salient portions at different scales; and
   displaying image data substantially on the path in an order such that a salient portion corresponding to a larger scale is displayed in preference to a salient portion corresponding to a smaller scale.

4. A method as claimed in claim 3, wherein the image data includes the determined salient portions.

5. A method as claimed in claim 2, wherein salient portions are displayed in an order dependent on their disposition within the image.

6. A method as claimed in claim 5, wherein displaying salient portions further comprises:
   for a salient portion under display, determining the distance to other salient portions; and
   on the basis of the determination of distance, selecting a salient portion for subsequent display, wherein a portion which is closer to the portion under display is selected in preference to other portions.

7. A method as claimed in claim 1, wherein the weighting functions are a set of center-surround kernels of respectively different spatial scales.

8. A method as claimed in claim 7, wherein the kernels have substantially positive coefficients in an inner spatial region thereof, and substantially negative coefficients in an outer spatial region thereof.

9. A method as claimed in claim 1, wherein the output data further comprises image data surrounding the determined regions of interest such that the output image data further provides a bounding box around respective regions of interest.

10. A method of processing image data representing an image, the method comprising steps stored on a tangible computer readable medium and performed by a processor, the steps comprising:
    generating saliency data by determining a series of features of the image and using the determined features to generate a probability measure for each point of the image representative of a location of a subject of the image;
    convolving the saliency data with a set of functions of respectively different spatial scales in order to generate response data representing a saliency density for the image at respective ones of the spatial scales;
    determining from the response data spatial maxima in the saliency density across the respective scales for respective ones of the determined features; and
    selecting, using the spatial and scale location of a determined maxima, image data representing a salient image portion at that scale.

11. A method as claimed in claim 10, wherein the set of functions are a set of center-surround kernels adapted to comprise substantially positive coefficients in an inner spatial region thereof, and substantially negative coefficients in an outer spatial region thereof.

12. A method as claimed in claim 10, wherein the saliency density comprises a measure of the relative number of salient portions falling under the support of the function at the image area in question.

13. A method of processing image data representing an image captured using an image capture device, the method comprising steps stored on a tangible computer readable medium and performed by a processor, the steps comprising:
    processing the image data in order to generate saliency data representing salient portions of the image;
    processing the saliency data at a plurality of spatial scales using respective ones of a plurality of weighting functions, the processing operable to generate response data representative of a measure of the relative saliency of portions of the image at respective ones of the spatial scales;
    using the response data in order to determine a preferred scale for the salient portions of the image by determining maxima in the response data for respective ones of the salient portions, and generating region data representing respective ones of the salient portions at their preferred scales;

using the region data to generate a visualization path which substantially traverses respective ones of the salient portions, wherein the path is generated on the basis of the scale of the salient portions, and the relative distance between salient portions.

14. Image capture apparatus comprising a processor, the processor operable to process image data in accordance with steps, stored in a tangible computer readable medium, of the method as claimed in claim 1.

15. Apparatus comprising a processor operable to process image data representing an image, in accordance with computer executable program codes stored on a tangible computer readable medium, the processor operable to:

generate saliency data for the image by determining a series of features of the image and using the determined features to generate a probability measure for each point of the image representative of a location of a subject of the image;

process the saliency data using respective ones of weighting functions of a plurality of spatial scales in order to determine the positions of regions of interest of the image at respective ones of the scales;

generate response data for each scale representing the relative strength of response of the saliency data at the positions of the determined regions of interest to the function at that scale;

for each determined region of interest, process the response data to determine a maximum response over all scales for that region; and use the position in the image corresponding to the determined maximum and the scale at which the maximum occurs to generate output image data representing a salient portion of the image at that scale which corresponds to the region of interest in question.

16. Apparatus as claimed in claim 15, wherein the output image data is presented using a display of the apparatus such that output image data representing a salient portion corresponding to a larger scale is displayed in preference to image data representing a salient portion corresponding to a smaller scale.

17. Apparatus as claimed in claim 15, wherein the processor is further operable to:

generate path data representing a path which substantially traverses respective ones of the salient portions at different scales; and render suitable for display image data substantially on the path in an order such that a salient portion corresponding to a larger scale is displayed in preference to a salient portion corresponding to a smaller scale.

18. Apparatus as claimed in claim 16, wherein salient portions are displayed in an order dependent on their disposition within the image.

19. Apparatus as claimed in claim 18, wherein displaying salient portions further comprises:

for a salient portion under display, determining the distance to other salient portions; and on the basis of the determination of distance, selecting a salient portion for subsequent display, wherein a portion which is closer to the portion under display is selected in preference to other portions.

20. A computer program product for use with a computer, said computer program product comprising a tangible computer readable medium having computer executable program code embodied thereon, wherein said product is operable, in association with said computer, to:

generate saliency data using image data representing a captured image by determining a series of features of the image and use the determined features to generate a probability;

measure for each point of the image representative of a location of a subject of the image;

process the saliency data using respective ones of weighting functions of a plurality of spatial scales in order to determine the positions of regions of interest of the image at respective ones of the scales;

generate response data for each scale representing the relative strength of response of the saliency data at the positions of the determined regions of interest to the function at that scale;

for each determined region of interest, process the response data to determine a maximum response over all scales for that region; and use the position in the image corresponding to the determined maximum and the scale at which the maximum occurs to generate output data representing a salient portion of the image at that scale which corresponds to the region of interest in question.

21. A logic circuit comprising an image capture element configured to generate image data, a processor configured to perform digital signal processing operations on the image data, a memory configured to store the image data and processed image data processed by the processor, and a bus coupled therebetween, said logic circuit configured to operate in accordance with the method claimed in claim 1.

* * * * *